US012537390B2

(12) United States Patent
Kim et al.

(10) Patent No.: US 12,537,390 B2
(45) Date of Patent: Jan. 27, 2026

(54) WIRELESS CHARGING DEVICE CAPABLE OF SUPPORTING USER TERMINAL IN VARIOUS DIRECTIONS AND AT VARIOUS ANGLES

(71) Applicant: LG ELECTRONICS INC., Seoul (KR)

(72) Inventors: Kyunghwan Kim, Seoul (KR); Seong Hun Lee, Ulju-gun (KR); Gyunghwan Yook, Seoul (KR); Hyoung Seok Kim, Seoul (KR); Hwanyong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 761 days.

(21) Appl. No.: 17/790,266

(22) PCT Filed: Dec. 30, 2019

(86) PCT No.: PCT/KR2019/018736
§ 371 (c)(1),
(2) Date: Jun. 30, 2022

(87) PCT Pub. No.: WO2021/137311
PCT Pub. Date: Jul. 8, 2021

(65) Prior Publication Data
US 2023/0032749 A1 Feb. 2, 2023

(51) Int. Cl.
*H01M 10/46* (2006.01)
*H02J 7/00* (2006.01)
(Continued)

(52) U.S. Cl.
CPC .......... *H02J 50/005* (2020.01); *H02J 7/0044* (2013.01); *H02J 50/10* (2016.02); *H02J 50/402* (2020.01)

(58) Field of Classification Search
CPC ...... H02J 7/0042; H02J 7/0044; H02J 50/005; H02J 50/10; H02J 50/50
(Continued)

(56) References Cited

U.S. PATENT DOCUMENTS

| 2015/0077927 A1* | 3/2015 | Barnett ................. G06F 1/1686 361/679.43 |
| 2018/0358826 A1 | 12/2018 | Allen et al. |
| 2020/0083726 A1 | 3/2020 | Kim et al. |

FOREIGN PATENT DOCUMENTS

| JP | 2014-79053 A | 5/2014 |
| KR | 200467441 Y1 * | 6/2013 |

(Continued)

OTHER PUBLICATIONS

Machine translate of KR 10-2015-0115256 (Oct. 14, 2015) (Year: 2015).*

(Continued)

*Primary Examiner* — Edward Tso
(74) *Attorney, Agent, or Firm* — Birch, Stewart, Kolasch & Birch, LLP

(57) ABSTRACT

Discussed is a wireless charging device which can change the direction of a magnetic field, generated in a transmission coil, through a vertically and horizontally rotatable repeater, and can hold a user terminal in parallel with the repeater, thereby transmitting wireless power in various directions and at various angles. The wireless charging device includes a case, a flat plate core disposed in the case, multiple transmission coils arranged parallel to each other on the flat plate core, a terminal holder including a repeater therein and disposed on the top surface of the case while sloping with respect to the top surface of the case, and a moving member for moving the terminal holder in the direction in which the plurality of transmission coils are arranged.

20 Claims, 16 Drawing Sheets

(51) Int. Cl.
  *H02J 50/00*     (2016.01)
  *H02J 50/10*     (2016.01)
  *H02J 50/40*     (2016.01)

(58) Field of Classification Search
  USPC .......................................... 320/107, 108, 114
  See application file for complete search history.

(56) References Cited

FOREIGN PATENT DOCUMENTS

| | | | |
|---|---|---|---|
| KR | 20150115256 A | * | 10/2015 |
| KR | 10-2017-0130230 A | | 11/2017 |
| KR | 10-2018-0074372 A | | 7/2018 |
| KR | 10-2018-0107603 A | | 10/2018 |
| KR | 10-1944856 B1 | | 2/2019 |
| WO | WO-2015152461 A1 * | 10/2015 | .............. H02J 50/12 |

OTHER PUBLICATIONS

Niu et al., "Optimal Single Relay Position of a 3-Coil Wireless Power Transfer System", The Journal of Engineering, total 14 pages.

* cited by examiner

[FIG. 1]
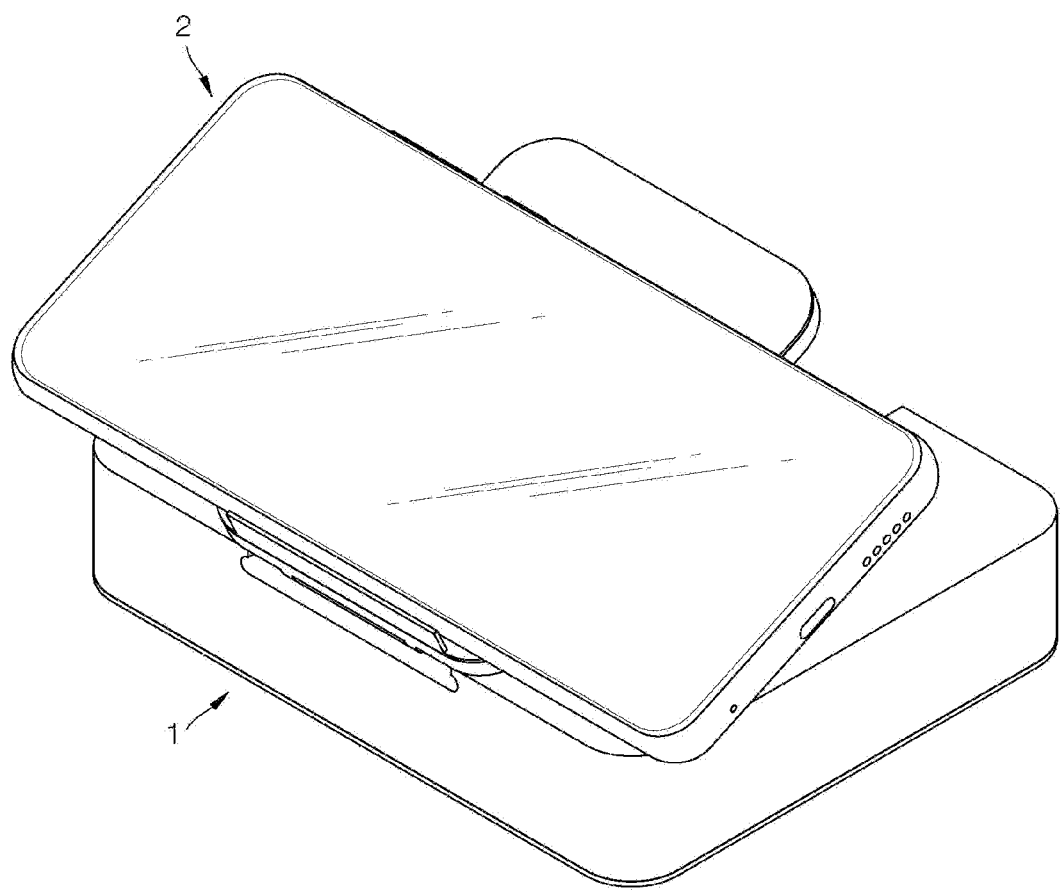

[FIG. 2]
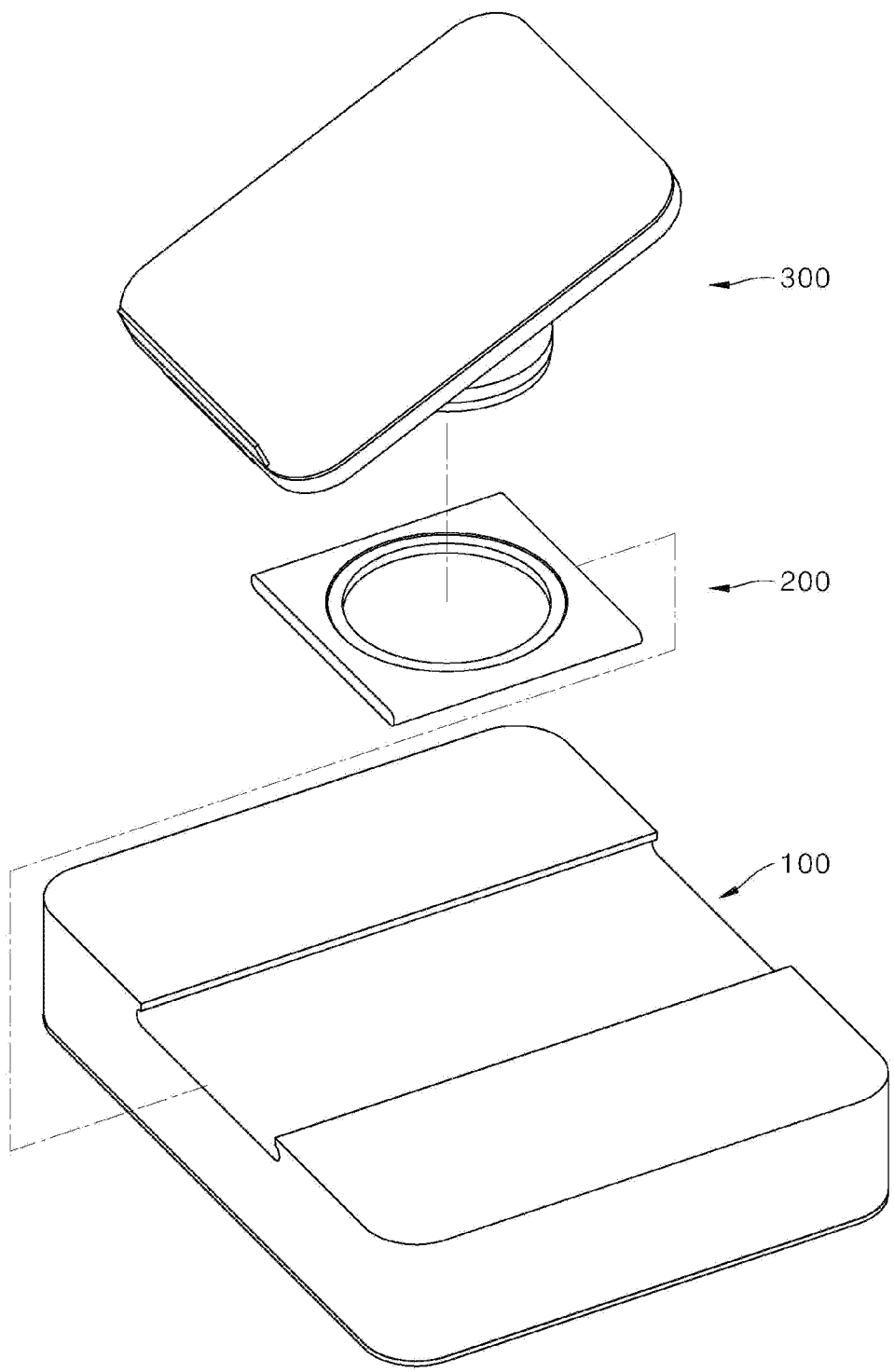

[FIG. 3]
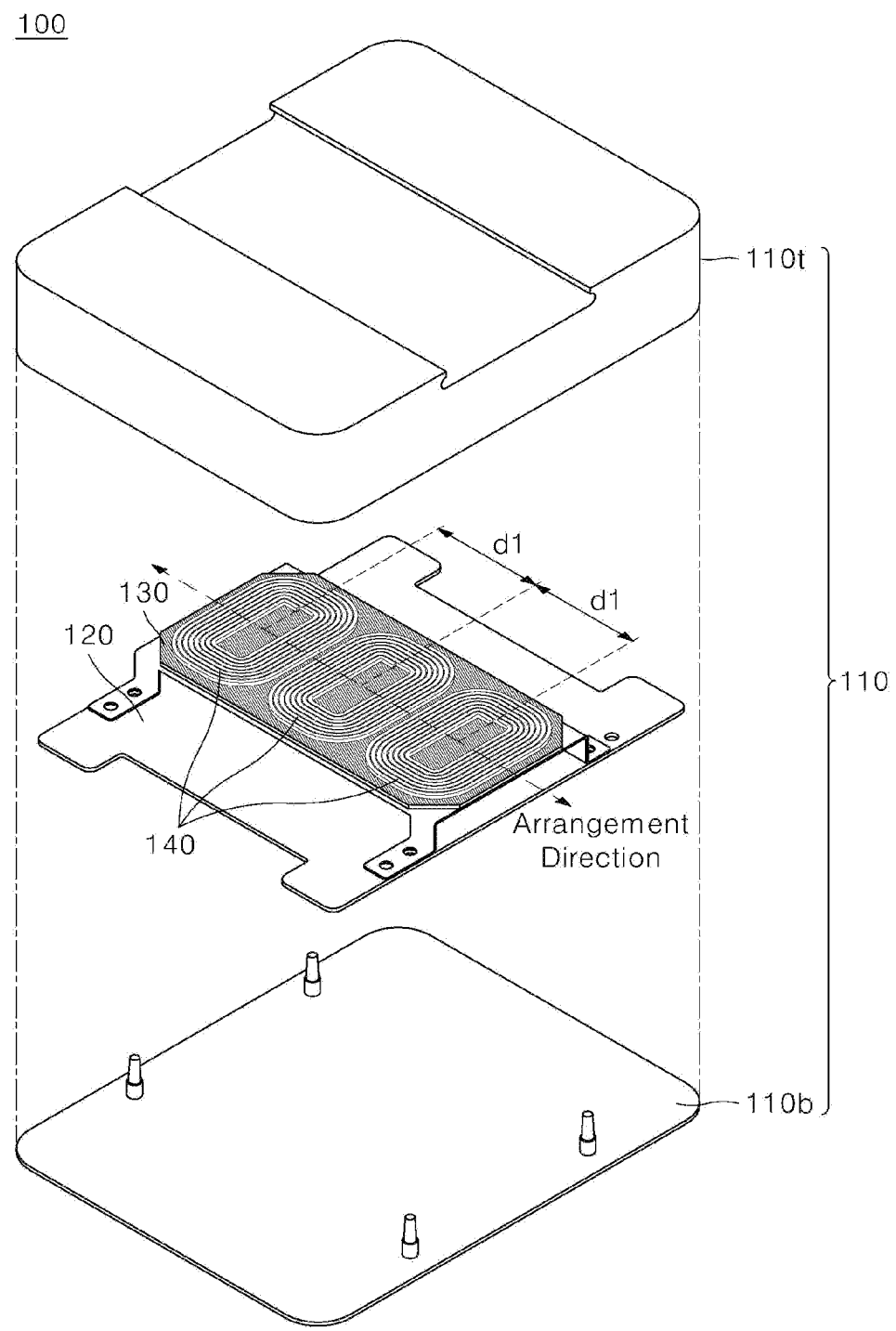

[FIG. 4]
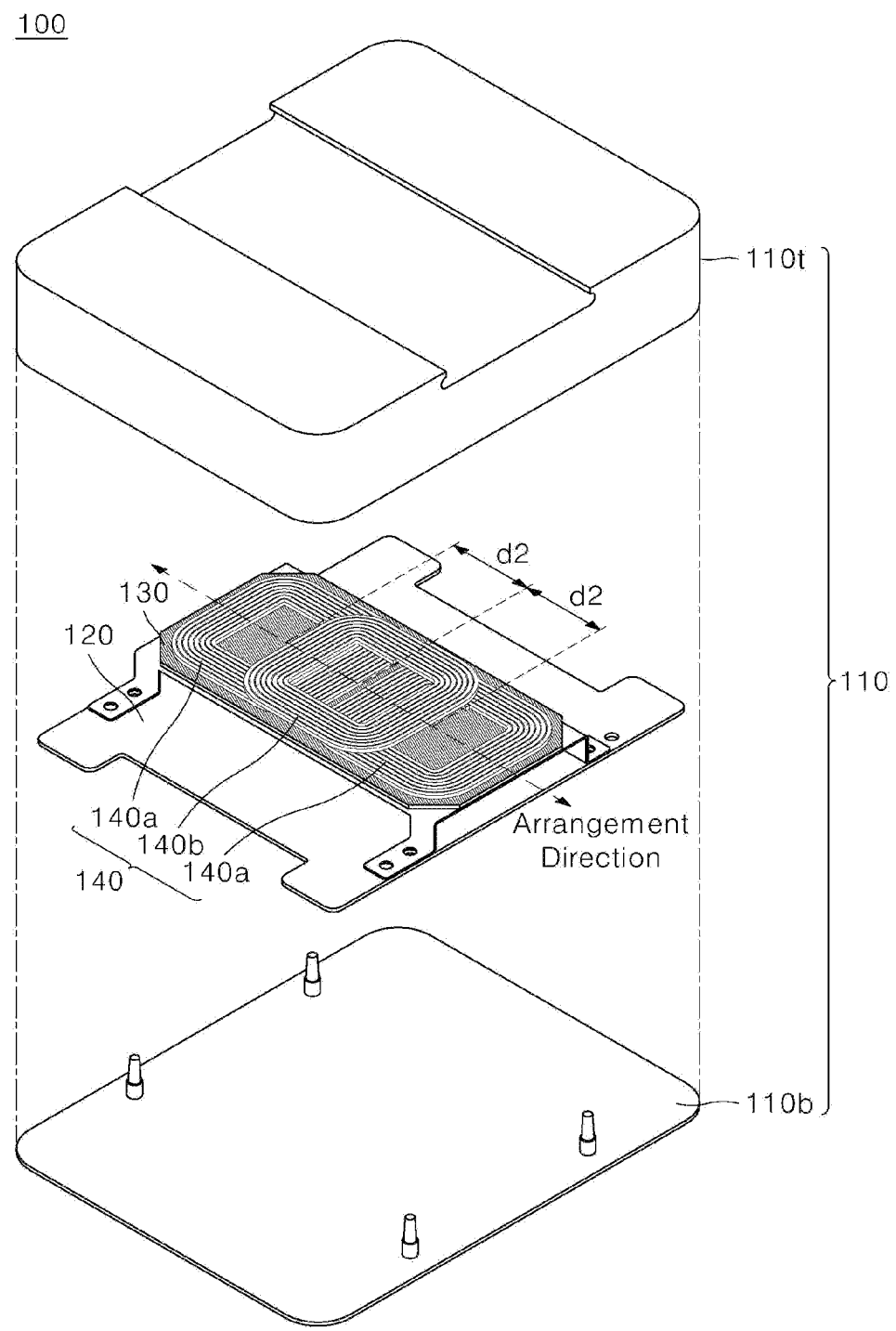

[FIG. 5]
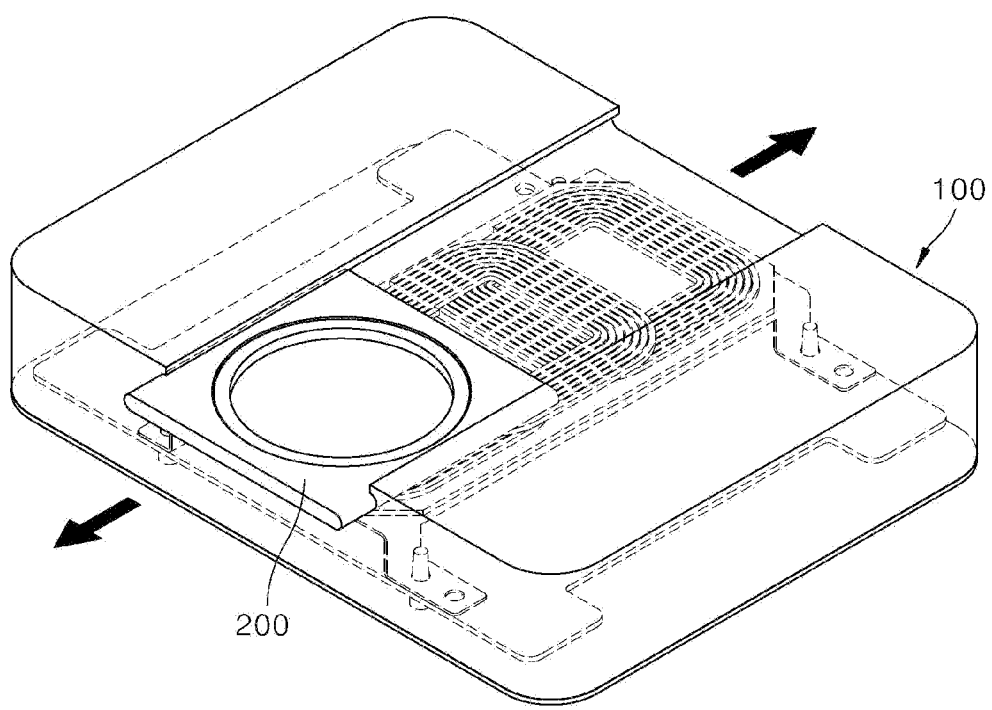

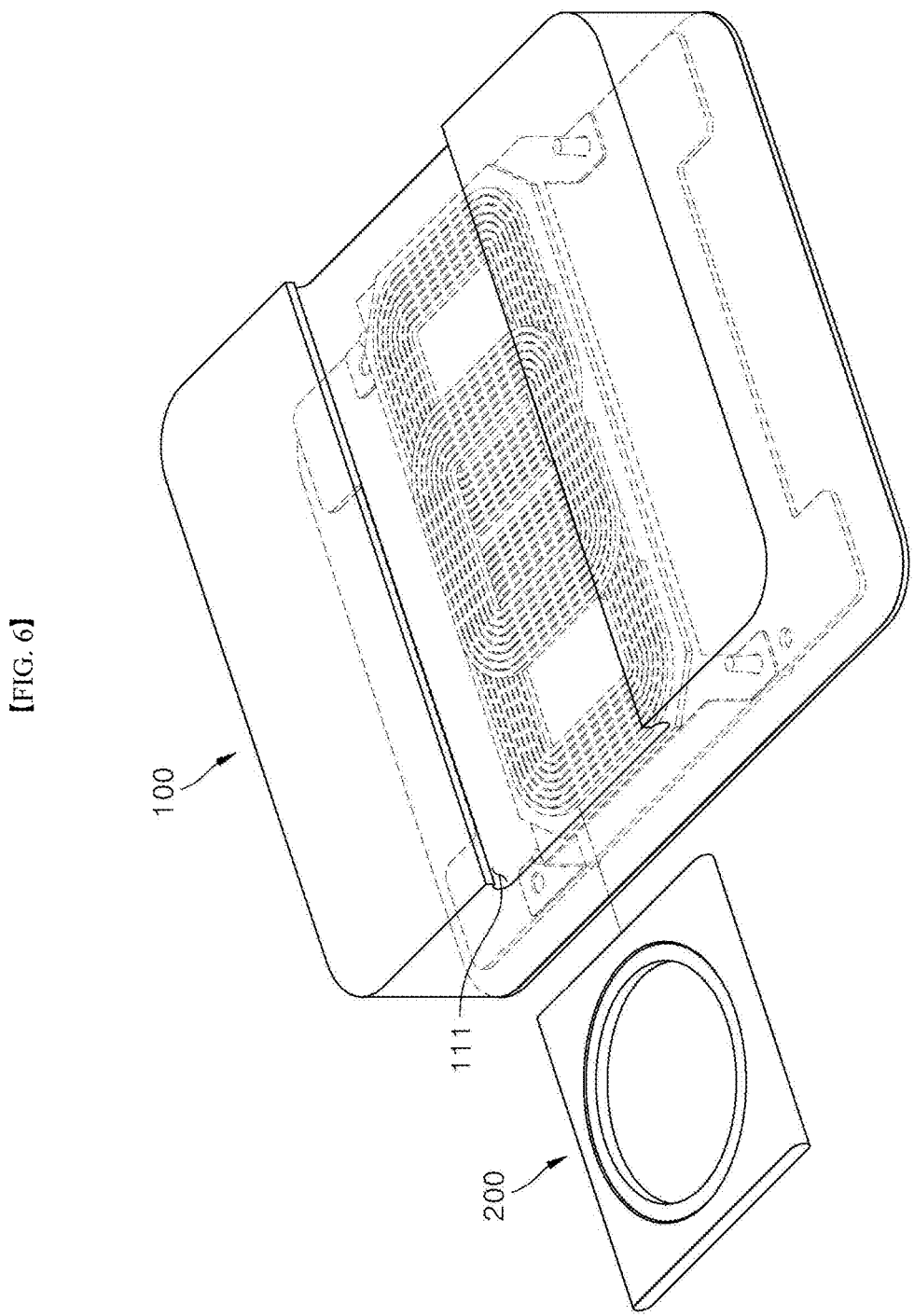
[FIG. 6]

【FIG. 7】
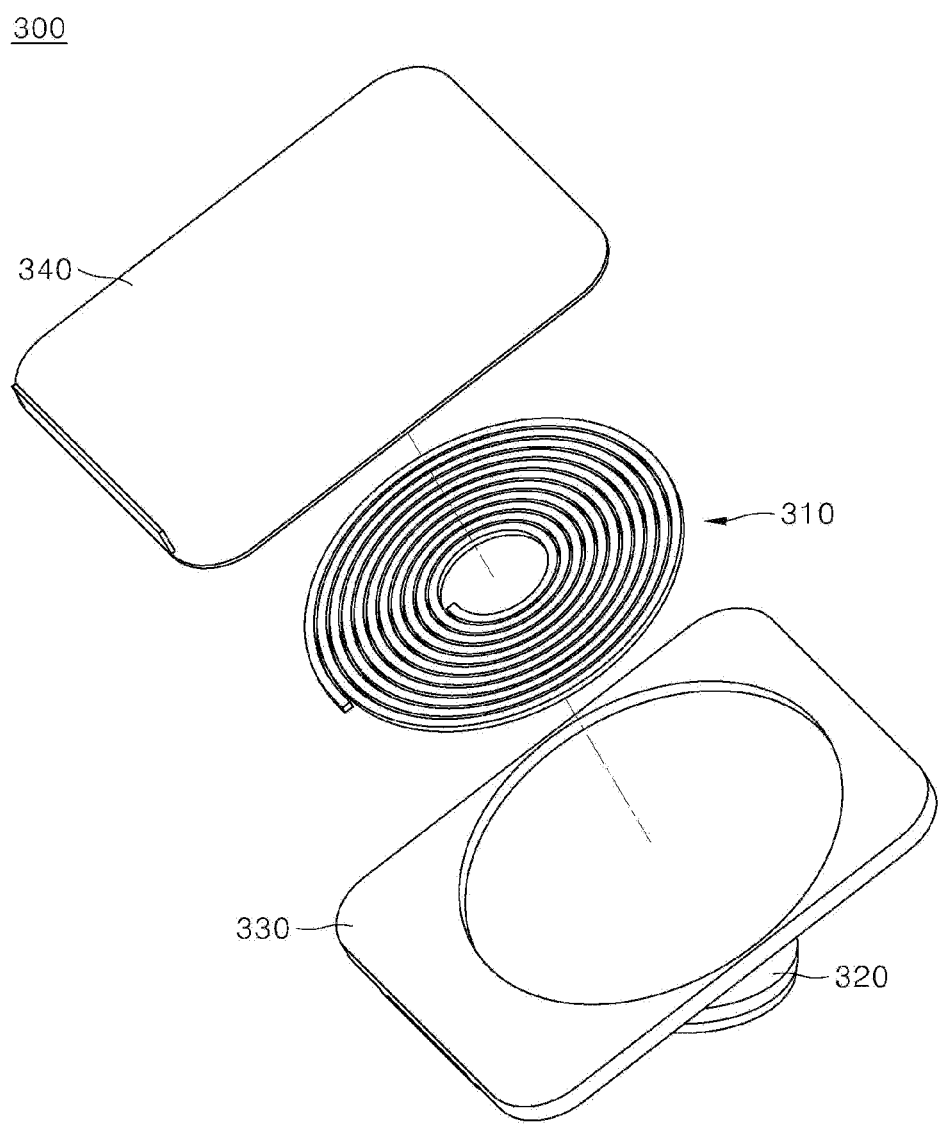

[FIG. 8]
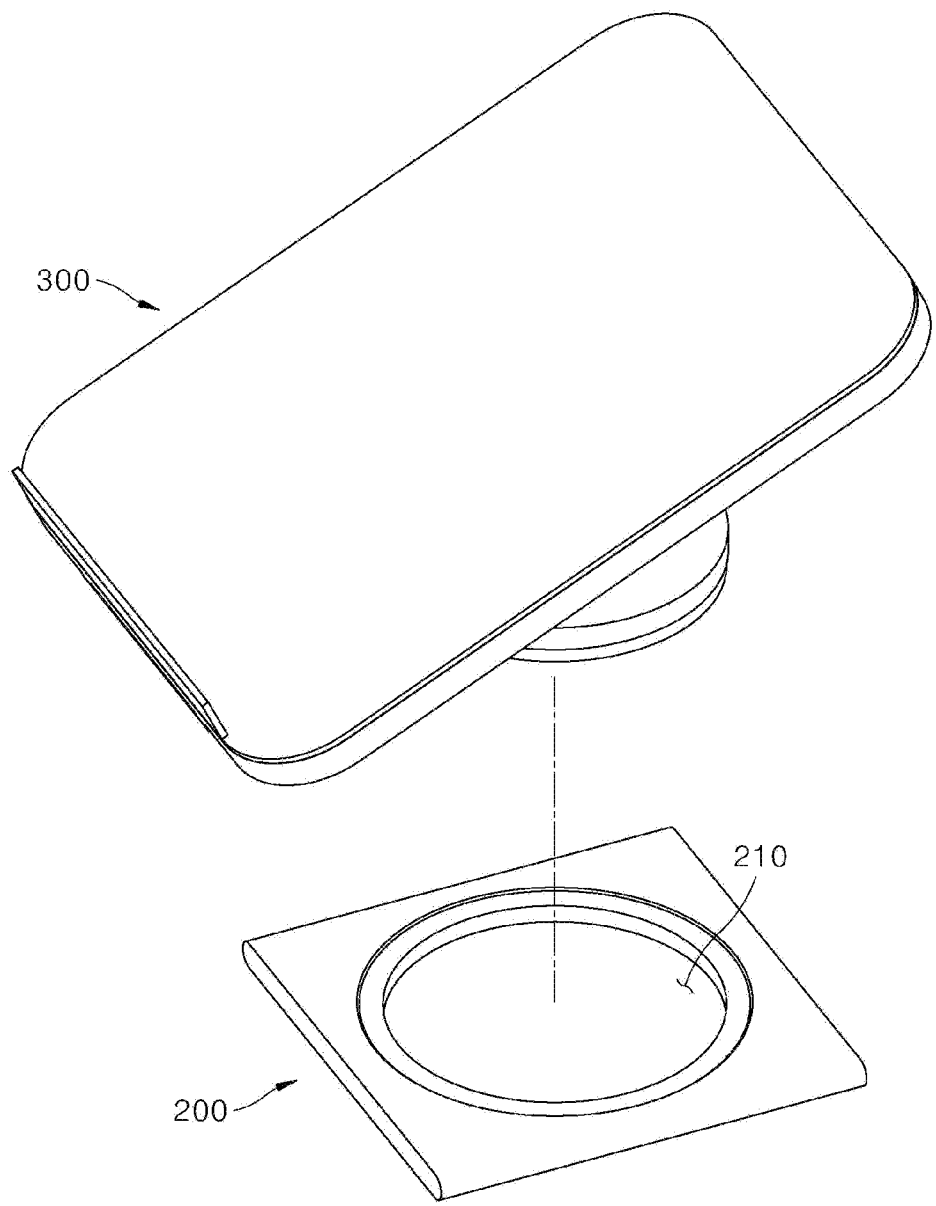

[FIG. 9]
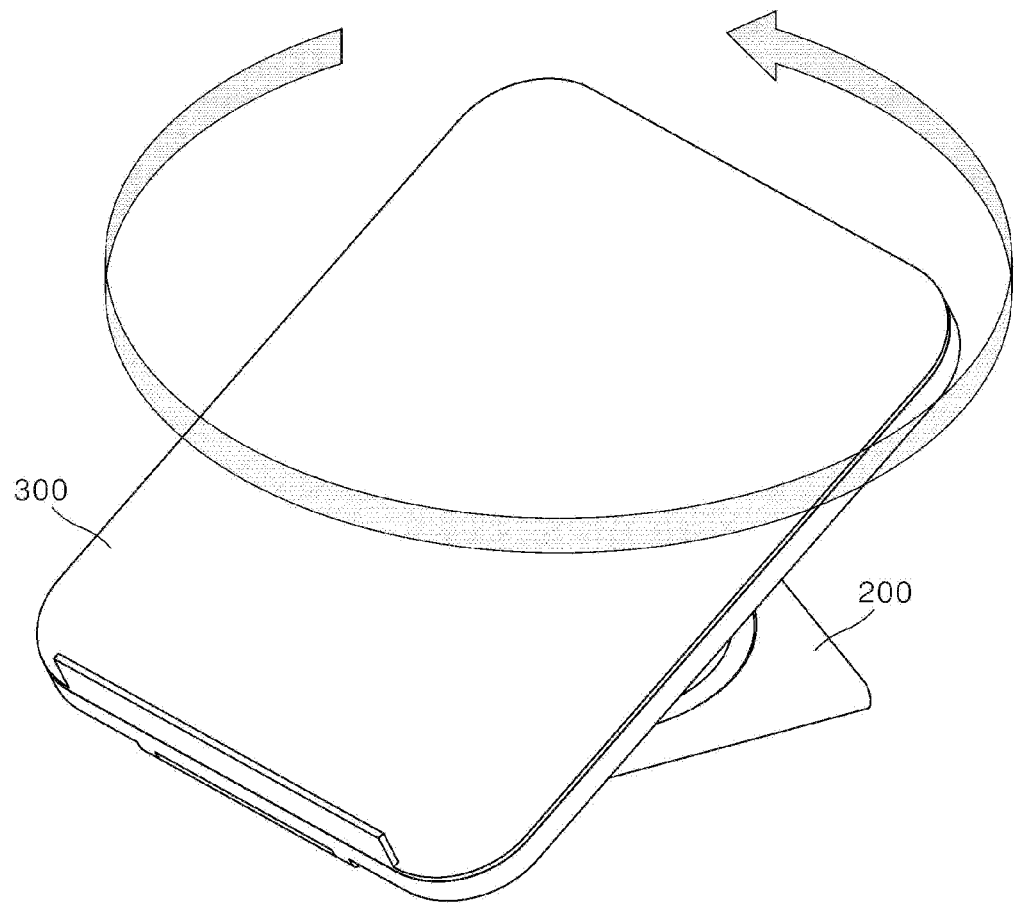

[FIG. 10]
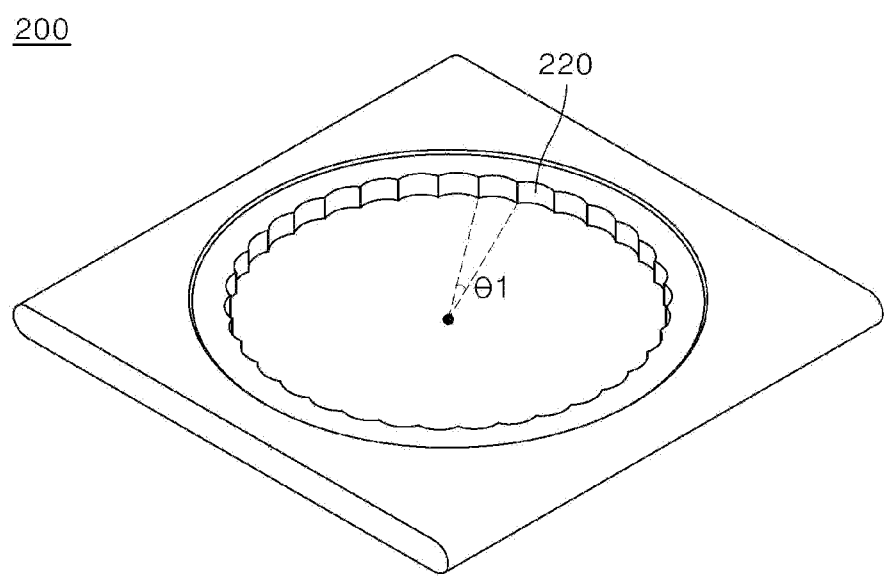

[FIG. 11]
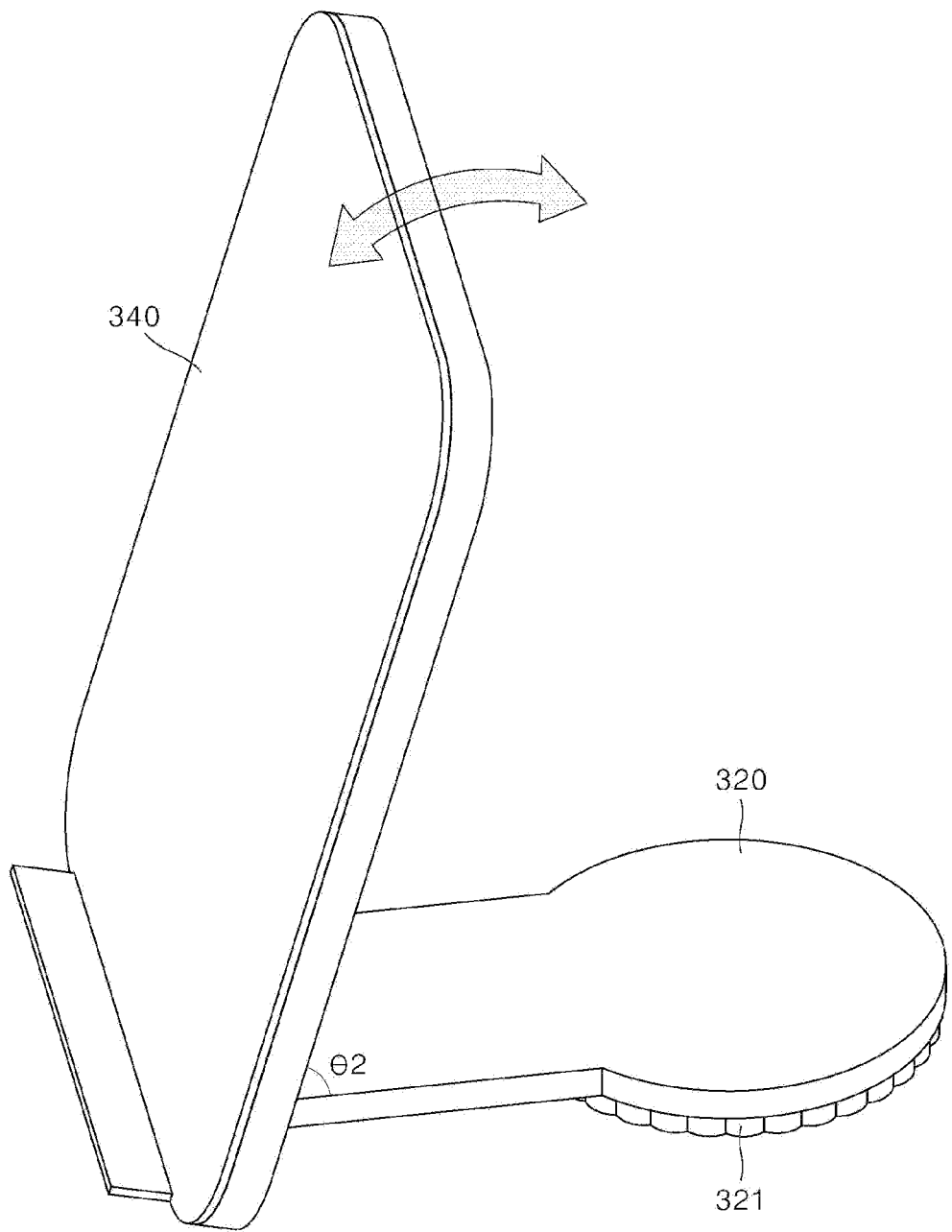

【FIG. 12】
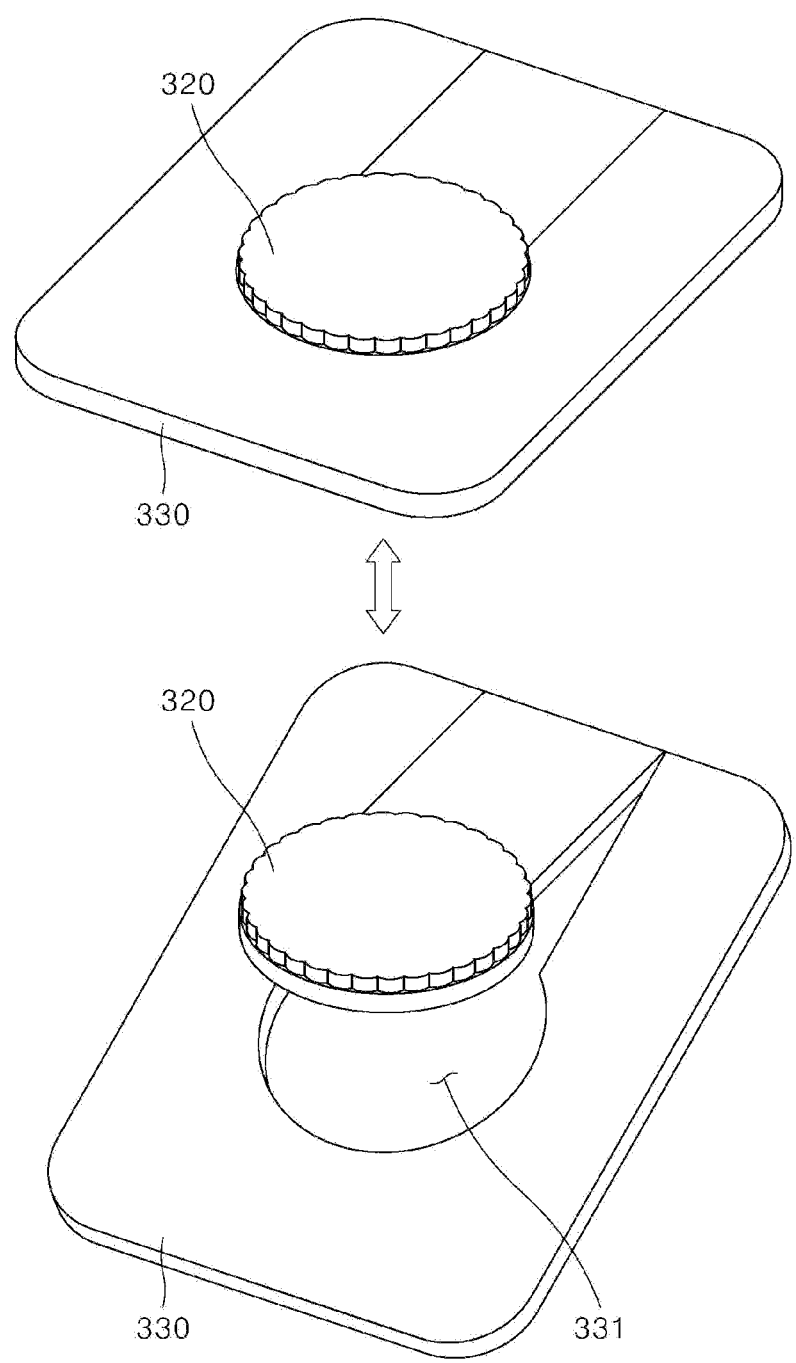

【FIG. 13】
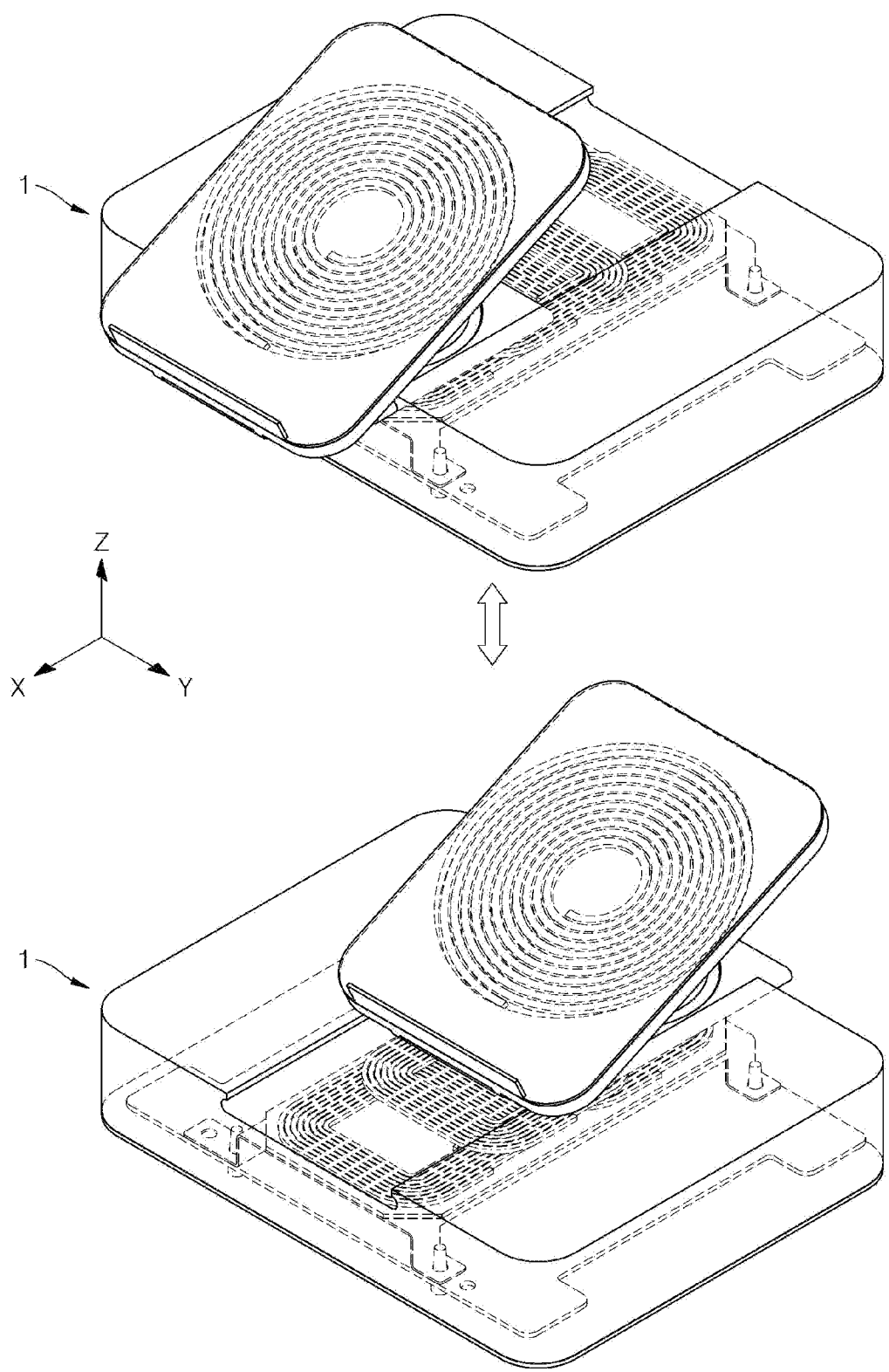

[FIG. 14]
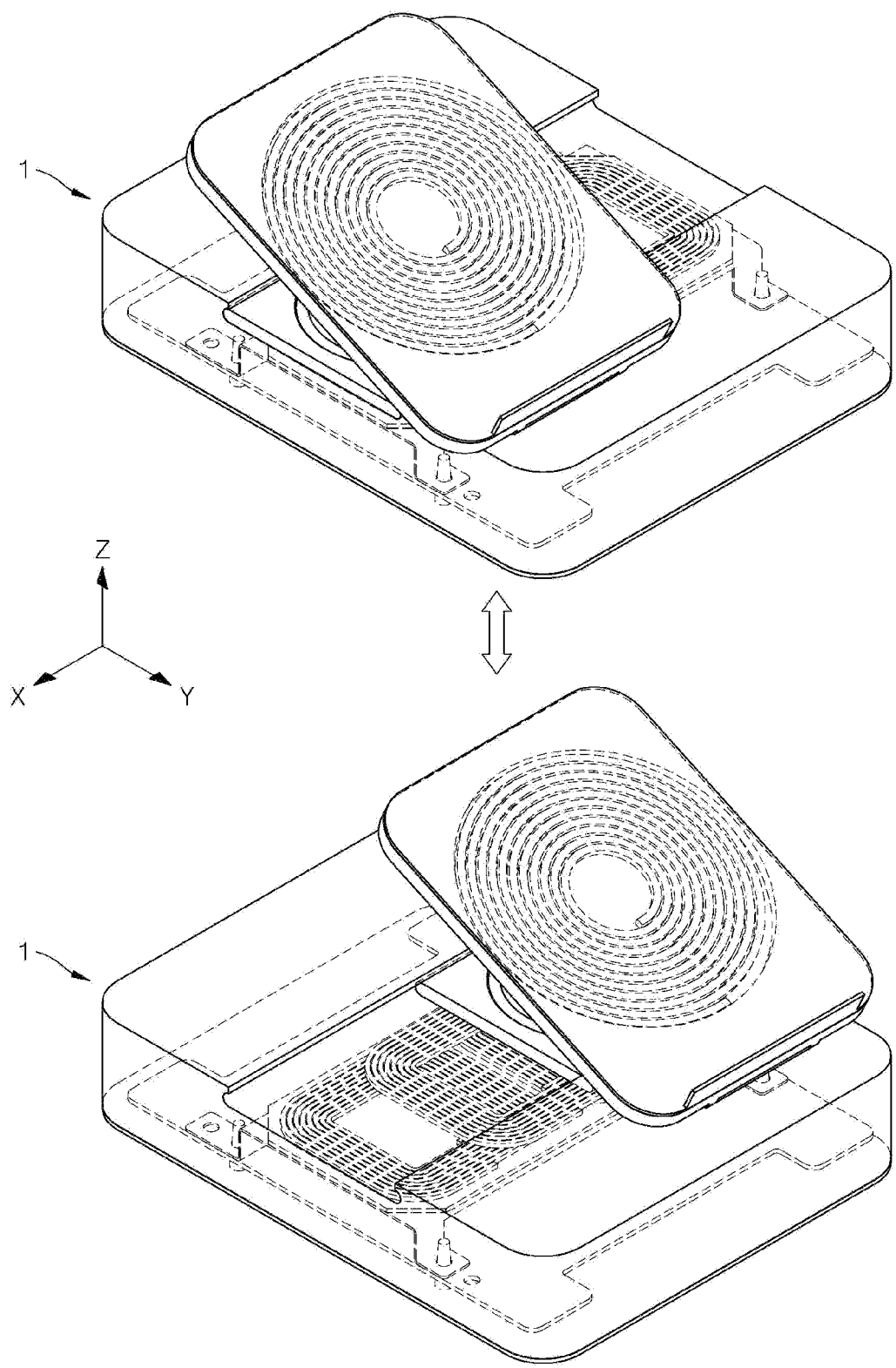

[FIG. 15]
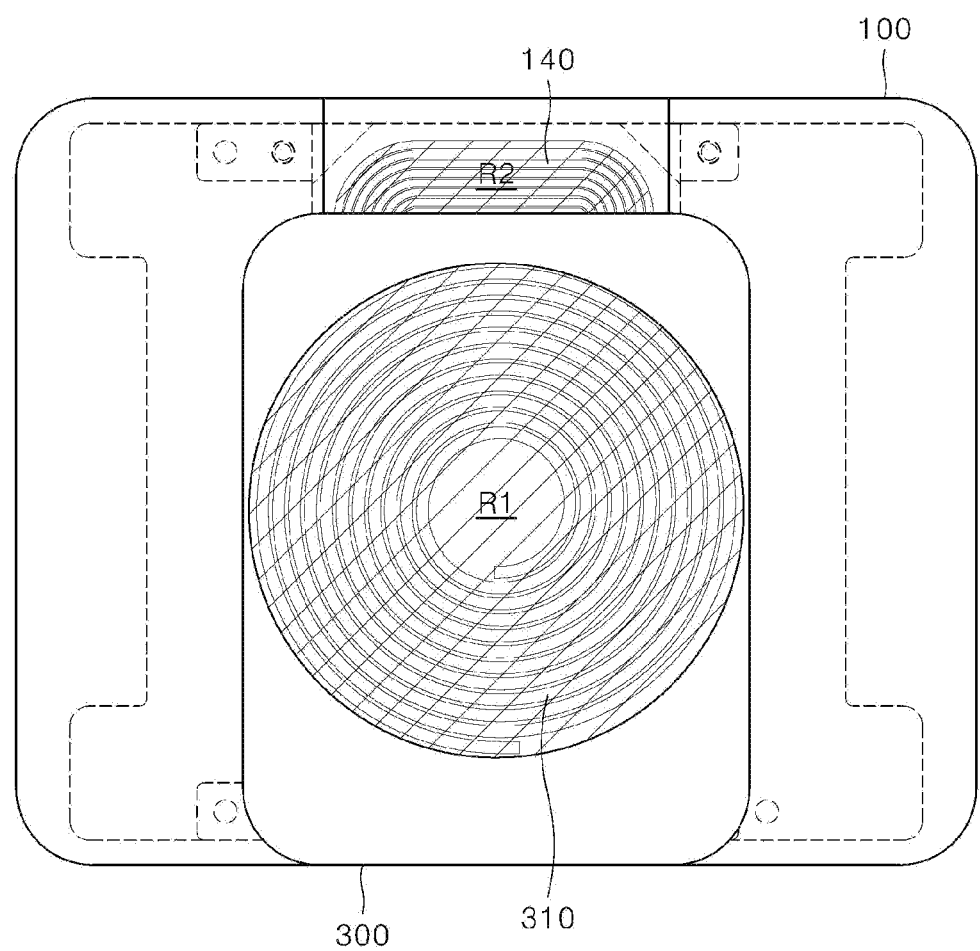

[FIG. 16]
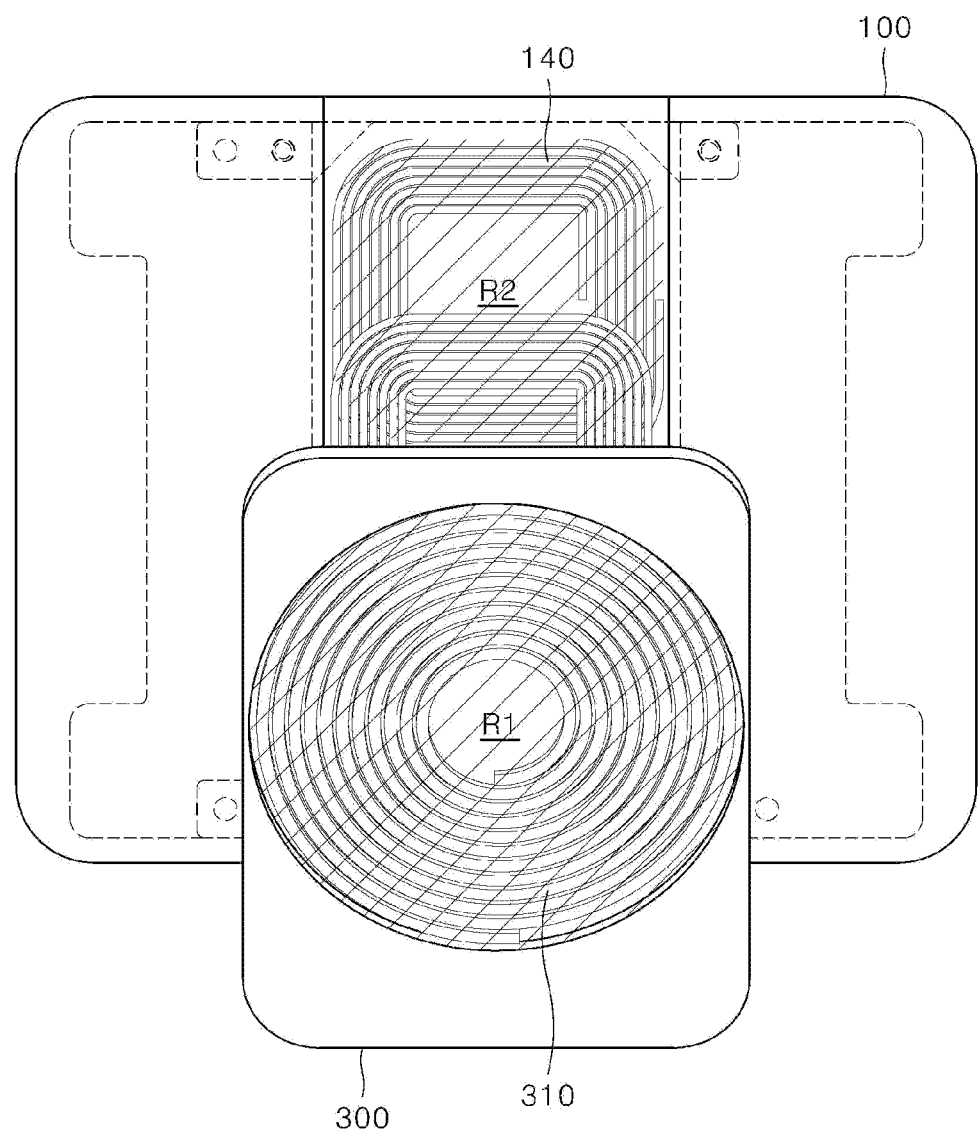

WIRELESS CHARGING DEVICE CAPABLE OF SUPPORTING USER TERMINAL IN VARIOUS DIRECTIONS AND AT VARIOUS ANGLES

CROSS REFERENCE TO RELATED APPLICATIONS

This application is the National Stage filing under 35 U.S.C. 371 of International Application No. PCT/KR2019/018736, filed on Dec. 30, 2019, the contents which are hereby expressly incorporated by reference into the present application.

BACKGROUND

Technical Field

The present disclosure relates to a wireless charging device that may change the direction of a magnetic field generated in a transmission coil through a vertically and horizontally rotatable repeater and hole a user terminal in parallel with the repeater, thereby transmitting a wireless power in various directions and at various angles.

Background Art

Recently, a technology for charging a user terminal through a wireless charging method has been commercialized.

When explaining the process of charging the user terminal according to the wireless charging method, a user terminal may be mounted on a wireless charging device so that a transmitting coil provided in the wireless charging device and a receiving coil provided in the user terminal may be magnetically coupled to each other. Hence, the wireless charging device may apply a current to the transmitting coil.

Once the current is applied to the transmitting coil, a magnetic field may be generated and the magnetic field generated in the transmitting coil may induce a current in a receiving coil. The current induced in the receiving coil may be supplied to a battery mounted in the user terminal to charge the user terminal.

To efficiently transmit power in the aforementioned wireless charging method, the strength of the magnetic field generated in the transmitting coil and linking to the receiving coil should be large. For this purpose, the transmitting coil and the receiving coil should be disposed to face each other in parallel.

Due to this limitation, the user terminal must always be mounted flat on the top of the wireless charging device, but there is a disadvantage in that the usability of the user terminal could be very poor in this type of mounting.

For example, when a user wish to charge a user terminal while washing the screen output from the user terminal, the user has to mount the user terminal flat on the top of the wireless charging device. In this instance, the output direction of the screen is in the upward direction and it is difficult to view the screen output from the user terminal when the user is in front, rear or side of the wireless charging device.

Accordingly, there is a demand for a wireless charging device capable of wirelessly charging a user terminal regardless of the mounting shape of the user terminal.

DESCRIPTION OF DISCLOSURE

Technical Problems

Accordingly, an object of the present disclosure is to address the above-noted and other problems. Embodiments of the present disclosure provide a wireless charging device that may mount a user terminal on a repeater configured to change the direction of a magnetic field generated in a transmitting coil.

Another object of the present disclosure is to provide a wireless charging device that may move the mounted user terminal in a vertical direction or in a horizontal direction.

A further object of the present disclosure is to provide a wireless charging device that may preventing a decrease in the strength of a magnetic field provided in a receiving coil in the user terminal due to the user terminal being mounted at an angle.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

Embodiments of the present disclosure may provide a wireless charging device including a repeater provided in a terminal holder inclined with respect to an upper surface of a case disposed parallel to transmitting coils, thereby mounting a user terminal on the repeater configured to convert a direction of a magnetic field generated in the transmitting coils.

Further, embodiments of the present disclosure may further provide a wireless charging device including a terminal holder configured to be rotatable in a horizontal direction and movable with respect to an upper surface of a case, while forming a predetermined angle with respect to the upper surface of the case, thereby vertically rotating the mounted user terminal or rotating in a horizontal direction and moving the mounted user terminal.

Still further, according to the present disclosure, the repeater may be formed and arranged for a repeater projection area projected on the upper surface of the case to always be wider than an area formed by the transmitting coils, thereby preventing decrease in the strength of a magnetic field provided to a receiving coil inside the user terminal.

Advantageous Effect

The wireless charging device according to the present disclosure is capable of mount the user terminal on the repeater configured to change the direction of the magnetic field generated in the transmitting coil, thereby advantageously providing the magnetic field in the direction in which the receiving coil is arranged, regardless of the mounting shape of the user terminal. Also, the wireless charging device is capable of disposing the transmitting coil and the receiving coil spaced apart from each other, thereby advantageously lowering the amount of heat generated by wireless charging.

Further, the wireless charging is capable of rotating and moving the mounted user terminal vertically, thereby allowing the user to check the screen output from the user terminal in various positions even while charging the user terminal wirelessly.

Still further, the wireless charging device according to the present disclosure is capable of prevent a decrease in the strength of the magnetic field provide to the receiving coil in the user terminal due to the user terminal being mounted at an angle, thereby transmitting power to the user terminal with maximum efficiency regardless of the mounting shape of the user terminal.

Specific effects are described along with the above-described effects in the section of Detailed Description.

BRIEF DESCRIPTION OF DRAWINGS

FIG. 1 shows that a user terminal is mounted on a wireless charging device according to an embodiment of the present disclosure;

FIG. 2 is a cut-away view of elements provided in the wireless charging device shown in FIG. 1;

FIGS. 3 and 4 are exploded perspective views of power transmitting modules according to embodiments of the present disclosure, respectively;

FIGS. 5 and 6 are views to explain the coupling relation between a moving member and a power transmission module;

FIG. 7 is an exploded perspective view of a terminal holder according to an embodiment of the present disclosure;

FIGS. 8 and 9 are views to explain the relation between a terminal holder and a moving member;

FIG. 10 is a view to explain the structural features of the moving member to be coupled to the terminal holder;

FIG. 11 is a view to explain the structural features of the terminal holder to be coupled to the moving member and to mount the user terminal thereon;

FIG. 12 shows a coupling relation between a rotation plate and a mounting plate that are provided in the terminal holder;

FIGS. 13 and 14 are views showing use examples of a wireless charging device according to an embodiment of the present disclosure; and FIGS. 15 and 16 are views to explain the width of a repeater projected on an upper surface of a case provided in a power transmission module.

BEST MODE

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

In addition, expressions of 'a component is provided or disposed in an upper or lower portion' may mean that the component is provided or disposed in contact with an upper surface or a lower surface. The present disclosure is not intended to limit that other elements are provided between the components and on the component or beneath the component.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Throughout the disclosure, the terms "A and/or B" as used herein can denote A, B or A and B, and the terms "C to D" can denote C or greater and D or less, unless stated to the contrary.

The present disclosure relates to a wireless charging device that may change the direction of a magnetic field generated in a transmission coil through a vertically and rotatable in a horizontal direction repeater and hole a user terminal in parallel with the repeater, thereby transmitting a wireless power in various directions and at various angles.

Referring to FIGS. 1 to 16, the wireless charging device according to an embodiment of the present disclosure will be described.

FIG. 1 shows that a user terminal is mounted on a wireless charging device according to an embodiment of the present disclosure. FIG. 2 is a cut-away view of elements provided in the wireless charging device shown in FIG. 1.

FIGS. 3 and 4 are exploded perspective views of power transmitting modules according to embodiments of the present disclosure, respectively.

FIGS. 5 and 6 are views to explain the coupling relation between a moving member and a power transmission module.

FIG. 7 is an exploded perspective view of a terminal holder according to an embodiment of the present disclosure.

FIGS. 8 and 9 are views to explain the relation between a terminal holder and a moving member.

FIG. 10 is a view to explain the structural features of the moving member to be coupled to the terminal holder. FIG. 11 is a view to explain the structural features of the terminal holder to be coupled to the moving member and to mount the user terminal thereon;

FIG. 12 shows a coupling relation between a rotation plate and a mounting plate that are provided in the terminal holder.

FIGS. 13 and 14 are views showing use examples of a wireless charging device according to an embodiment of the present disclosure.

FIGS. 15 and 16 are views to explain the width of a repeater projected on an upper surface of a case provided in a power transmission module.

Referring to FIG. 1, a user terminal 2 may be mounted on the wireless charging device 2 according to the embodiment of the present disclosure. The wireless charging device may wirelessly transmit power to the mounted user terminal 2 and charge the user terminal 2.

Such the wireless charging device 1 may be realized as a portable device for charging the user terminal 2 at any positions. Also, it may be structurally coupled to other devices and then charge the user terminal 2. As one example, the wireless charging device 2 may be installed inside a vehicle, specifically, embedded in a dashboard. When a user mount the user terminal 2 on the wireless charging device 1, the wireless charging device 1 may charge the mounted user terminal 2.

The wireless charging device 1 may basically perform wireless transmission of power to the user terminal 2 in an electromagnetic induction method.

More specifically, when the wireless charging device 1 and the user terminal 2 mounted thereon are aligned, the wireless charging device 1 may be magnetically coupled to the user terminal 2 and power may be transmitted to the user terminal 2.

For that, the wireless charging device 1 may include a transmitting coil 140 provided therein and configured to generate a magnetic field. In other words, the wireless charging device 1 may wirelessly transmit power to the user terminal 2 through the transmission coil 140 provided therein to generate the magnetic field.

The power transmission principle of the wireless charging device 1 will be described in more detail.

When the user terminal 2 is mounted on the wireless charging device 1, a receiving coil provided inside the user terminal may be magnetically coupled to the transmitting coil 140 provided inside the wireless charging device 1. At this time, the wireless charging device 1 may apply a current to the transmitting coil 140 and a magnetic field may be generated in the transmitting coil 140. The magnetic field generated in the transmission coil 140 may be transmitted to the receiving coil to induce a current in the receiving coil. The current induced in the receiving coil may be supplied to a battery provided inside the user terminal 2 to charge the battery.

Referring to FIG. 2, the wireless charging device 1 according to the present disclosure for the above-described wireless charging operation may largely include a power transmission module 100, a moving member 200 and a terminal holder 300.

Hereinafter, referring to the accompanying drawings, each of the elements provided in the wireless charging device 1 will be described in detail.

First, the structure of the power transmission module 100 will be described in detail with reference to FIGS. 3 and 4.

Referring to FIGS. 3 and 4, the power transmission module 100 according to an embodiment of the present disclosure may include a case 110, a circuit board 120 disposed in the case 110, a flat plate core 130 disposed on the circuit board 120 and a plurality of transmitting coils 140 arranged side by side on the flat plate core 130.

The case 110 may include a top case 110t and a bottom case 110b. The top case 110t and the bottom case 110b may be coupled to each other to seal inner space defined in the case 110.

A control circuit configured to apply a current to the transmitting coil 140 using an external power source may be mounted on the circuit board 120. The control circuit may be implemented as a printed circuit board PCB, an integrated circuit IC or the like.

The flat plate core 130 may be made of a component that has high magnetic permeability and is not easily broken. More specifically, the flat plate core 130 may be made of an amorphous metal material such as cobalt Co, iron Fe, nickel Ni, boron B, silicon Si or a combination thereof. The flat plate core 130 may have a sheet or a thin film. For example, the flat plate core 130 according to the present disclosure may be a ferrite core.

Accordingly, the flat plate core 130 may increase the magnetic flux density of the magnetic field generated in the transmitting coil 140 and efficiently form a magnetic path of the magnetic field.

The plurality of transmitting coils 140 may flat-panel coils arranged side by side in one direction at a top of the flat panel core 130, and may be formed in a circular, oval or rectangular shape.

In one example as shown in FIG. 3, the plurality of transmitting coils 140 may be arranged side by side in a region formed by the flat plate core 130, spaced apart from each other. The plurality of transmitting coils 140 may be arranged side by side at the same interval. More specifically, the plurality of transmitting coils 140 may be arranged side by side so that the distance dl between the centers of each two transmitting coils may be the same.

Referring to FIG. 4, the plurality of transmitting coils 140 may include a plurality of first coils 140a spaced apart from each other on the flat plate core 130 and at least one second coil 140b partially overlapped with the first coils 140a on the first coils 140a.

Although the number of the first coils 140 and the second coils 140b is not limited, the transmitting coils 140 may include two first coils 140a and a single second coil 140b for convenience of description below.

As shown in FIG. 4, two first coils 140a may be disposed in a region defined by the flat plate core 130, spaced apart from each other on the flat plate core 130. The single second coil 140b may be disposed on the two first coils 140a to be overlapped with both of the first coils 140a. The first coils 140a and the second coil 140b may be arranged side by side at the same interval. In other words, the first coils 140a and the second coil 140b may be arranged side by side so that the distance between a center of each first coil 140a and a center of the second coil 140b.

Terminals for electrical connection with the above-noted control circuit may be provided at both ends of each transmitting coil 140, respectively, and the control circuit may apply a voltage to the terminals provided in the transmitting coils 140.

As one example, when the user terminal 2 is mounted on the wireless charging device 1 shown in FIG. 1, the control circuit may apply a voltage to at least one of the transmitting coils 140 that is magnetically connected with a receiving coil. Accordingly, a magnetic field may be generated in the transmitting coil 140 and the magnetic field generated in the transmitting coil 140 may induce a current in the receiving coil provided in the user terminal 2. The current induced in the receiving coil may charge the battery embedded in the user terminal 2.

Next, referring to FIGS. 5 and 6, the function and structure of the movable member 200 will be described in detail.

The moving member 200 may be coupled to the power transmission module 100 described above and configured to move a terminal holder 300 which will be described below along an alignment direction of the transmitting coil 140. As shown in FIGS. 3 and 4, the plurality of transmitting coils 140 may be arranged side by side in a specific direction. The moving member 200 coupled to the terminal holder 300 may move on the power transmission module 100 to move the terminal holder 300 along the direction in which the transmitting coils 140 are arranged (hereinafter, the arrangement direction).

Accordingly, regardless of how far and which direction the moving member 200 moves, the position of the terminal holder 300 may always be located on the line in which the transmitting coils 140 are arranged. In other words, the terminal holder 300 may always be located on any transmitting coils 140.

To move the terminal holder 300 along the arrangement direction of the transmitting coils 140, the moving member 200 may be provided on an upper surface of a case disposed in the power transmission module 100 and slide along the arrangement direction of the transmitting coils 140.

Referring to FIG. 5, the moving member 200 may movably coupled to the upper surface of the case 110 and slide along the arrangement direction of the transmitting coils 140, in a state of being coupled to the case 110. Specifically, the moving member 200 may be coupled to the upper surface of the case 110 to slide on a straight line in which the transmitting coils 140 are arranged.

For that, the moving member 200 may be coupled to the upper surface of the case 110 member 200 in various coupling structures. As one example, a rail may be fixedly provided on the top surface of the case 110 and the moving member 200 may be coupled to the rail to slide there along. In addition, a groove may be provided in the top surface of the case 110 along the arrangement direction of the transmitting coils 140. The moving member 200 may be secured to the groove to slide.

As described in detail referring to FIG. 6, a sliding groove 111 may be provided in the top surface of the case 110 on the straight line in which the transmitting coils 140 are arranged. The sliding groove 111 may be extended along the arrangement direction of the transmitting coils 140. The sliding groove 111 may be recessed from the top surface of the case 110 to be integrally formed with the top surface of the case 110.

At this time, the moving member 200 may be secured to the sliding groove 111 to slide along the arrangement direction of the transmitting coils 140. Specifically, the moving member 200 may have a flat plate structure, and both sides of the moving member 200 may be formed to correspond to a curved shape of the sliding groove 111 formed on the upper surface of the case 110.

As the side ends of the moving member 200 gets closer to the sliding groove 111, the moving member 200 may be coupled to the sliding groove 111 and slide along the sliding groove 111 extended along the arrangement direction of the transmitting coils 140.

Next, the function of the terminal holder 300 will be described in detail.

The terminal holder 300 may be provided in the upper surface of the case 110 provided in the power transmission module 100. The terminal holder 300 may hold the user terminal in a state of being inclined with respect to the upper surface of the case 110.

Meanwhile, to improve power transmission efficiency, the strength of the magnetic field generated in the transmitting coils 140 and linking to the receiving coil should be large. For that, the transmitting coils 140 and the receiving coil have to be disposed to face each other in parallel.

However, if the user terminal 2 is mounted on the terminal holder 300 in parallel in a state where the terminal holder 300 is inclined with respect to the top surface of the case 110, the transmitting coil 140 of the power transmitting module 100 and the receiving coil of the user terminal 2 could not be arranged to face each other in parallel. Then, the strength of the magnetic field generated in the transmitting coil 140 and linking to the receiving coil might get weak enough to lower power transmission efficiency.

To prevent that, the terminal holder 300 may include repeater 310 provided therein and configured to convert a direction of the magnetic field generated in the transmitting coil 140 toward the receiving coil. Specifically, the terminal holder 300 may include a repeater 300 opposite to the receiving coil in parallel, when the user terminal 2 is mounted on the terminal holder 300.

The magnetic field generated upward from the transmitting coil 140 may linkage to the repeater, so that a current may be induced to the repeater 310. The current induced to the repeater 310 may generate a magnetic field perpendicular to the repeater 310. As passing through the repeater 310, the magnetic field generated in the transmitting coil 140 upward may be converted into the magnetic field generated in the perpendicular direction.

Since the repeater 310 and the receiving coil are disposed to face each other, a large amount of the magnetic field may link in the receiving coil, thereby preventing a decrease in power transmission efficiency.

As described above, the user terminal 2 may be mounted on the repeater 310 configured to convert the direction of the magnetic field generated in the transmitting coil 140 according to the present disclosure. Accordingly, regardless of the mounting type of the user terminal 2, the magnetic field may be provided in the direction in which the receiving coil of the user terminal 2 is disposed. In addition, since the transmitting coil 140 and the receiving coil are spaced apart from each other, the amount of heat generated by wireless charging may be lowered advantageously.

Next, referring to FIGS. 7 to 12, the structure of the terminal holder 300 and the connection relationship between the terminal holder 300 and the moving member 200 will be described in detail.

Referring to FIG. 7, in addition to the repeater 310, the terminal holder 300 may include a rotation plate 320 coupled to the moving member 200 to be rotatable in a horizontal direction, a mounting plate 330 coupled to the rotation plate 320, and a terminal mounting case 340 directly in contact with the user terminal 2 as an outer case of the terminal holder 300.

The terminal holder 300 configured as described above may be coupled to the moving member 200 to be rotatable in a horizontal direction.

More specifically, the rotation plate 320 of the terminal holder 300 may be coupled to the moving member 200 and rotating on the fixed moving member 200 in the horizontal direction to rotate the terminal holder 300 in the horizontal direction.

Referring to FIG. 8, to rotatably couple the terminal holder 300 to the moving member 200, a circular-shaped recessed portion 210 may be formed in the moving member 200. More specifically, the recessed portion 210 may be formed in a shape that is recessed downward. The rotation plate 320 of the terminal holder 300 may have a disk shape corresponding to the shape of the recessed portion 210 to be inserted therein.

The rotation plate 320 of the terminal holder 300 may be rotatable after inserted in the recessed portion 210.

Referring to FIG. 9, the rotation plate 320 may be rotated in a horizontal circumferential direction, while being inserted in the recessed portion. Accordingly, the repeater 310, the mounting plate 330 and the terminal mounting case 340 that are coupled to the rotation plate 320 may be also rotated in a circumferential direction along with the rotation of the rotation plate 320.

When the terminal holder 300 and the moving member 200 are coupled to each other as mentioned above, a plurality of rotation grooves 220 may be provided in an inner circumferential surface of the recessed portion 210 formed in the moving member 200 along a circumferential direction in parallel. The terminal holder 300 may be secured to the plurality of rotation grooves 220 to be rotatable in the horizontal direction by a unit angle.

Referring to FIG. 10, the plurality of rotation grooves 220 disposed side by side adjacent to each other at the same interval may be provided on the inner circumferential surface of the recessed portion 210. Accordingly, the center angle θ1 of each rotation groove 220 may be the same as a unit angle.

Once inserted in the recessed portion 210, the rotation plate 320 may be coupled to the plurality of rotation grooves 220 provided in the inner circumferential surface of the recessed portion 320. As one example, the rotation plate 320 may have the disk shape and the rotation plate 320 may be coupled to the plurality of rotation groove 220 provided on the inner circumferential surface of the recessed portion 210 through any coupling member provided on an outer circumferential surface thereof.

The rotation plate 320 coupled to the plurality of rotation grooves 220 may be secured by the elastic force of the coupling member coupled to each rotation groove 220. However, the rotation plate 320 coupled to the plurality of rotation grooves 220 may be rotated by a central angle (i.e., a unit angle) applied by an external force (e.g., a rotational force applied by the user). As one example, a coupling member coupled to a first rotation groove may be secured by the elastic force thereof. However, when the user rotates the rotation plate 320, the first coupling member may be rotated by the unit angle to be secured to a second rotation groove adjacent to the first rotation groove.

As it will be described in detail referring to FIG. 11, the rotation plate 320 may include a plurality of rotation protrusions 321 configured to be coupled to the plurality of rotation grooves 220, respectively. Specifically, the circular rotation plate 320 may include the plurality of rotation protrusions 321 disposed on an outer circumferential surface of the circular rotation plate 320.

In this instance, the plurality of rotation protrusions 321 formed in the rotation plate 320 may be coupled to the plurality of rotation grooves 220 formed in the recessed portion 210 of the moving member 200, respectively. For that, the central angle of each rotation protrusion 321 may also be the same as a unit angle.

The rotation protrusion 321 may be made of an elastic material. Accordingly, when the rotation plate 320 is fitted to the recessed portion 210, each rotation protrusion 321 may be completely coupled to the corresponding rotation groove 220 to be secured stably. If the user applies a rotational force to the rotation plate 320, the plurality of rotation protrusions 321 may be sequentially coupled to the plurality of rotation grooves 220 while rotating by a unit angle.

When the user rotates the terminal holder 300 having the structure, the user may be given a clicking feeling which may improve a feeling of use.

Meanwhile, the mounting plate 330 may be coupled to the rotation plate 320 to be rotatable in a vertical direction with respect to the rotation plate 320.

As described above, the moving member 200 may be disposed parallel to the power transmission module 100, and the rotation plate 320 may also be coupled to the moving member 200 in parallel. In order for the terminal holder 200 to be inclined with respect to the upper surface of the case in this state, the mounting plate 220 coupled to the rotation plate 2320 may be rotated with respect to the rotation plate 320 in a perpendicular direction as shown in FIG. 11.

More specifically, one side end of the mounting plate 220 may be coupled to the rotation plate 320 via a hinge shaft. Accordingly, the mounting plate 330 may be rotated in a vertical direction with respect to the rotation plate 320 secured to the moving member 200.

Since the rotation plate 320 is disposed parallel to the upper surface of the case 110, the angle θ2 formed by the rotation plate 320 and the mounting plate 330 may be equal to the angle formed by the user terminal 2 mounted on the terminal holder 300 with respect to the upper surface of the case 110.

Meanwhile, the mounting plate 330 may form an angle within a certain range with respect to the rotation plate 320. In other words, the mounting plate 330 may be rotated in the vertical direction within the maximum angle with respect to the rotation plate 320. For that, an arbitrary member configured to limit an angle may be further provided in various shapes in the hinge shaft connecting the mounting plate 330 and the rotation plate 320 with each other.

Limiting the maximum angle as described above may be to ensure high transmission efficiency when power is transmitted through the repeater 310. That will be described below, referring to FIGS. 15 and 16.

Referring to FIG. 12, the rotation plate 320 may be inserted in a holding groove 331 formed in a rear surface of the mounting plate 330. More specifically, the terminal mounting case 340 may be coupled to a front surface of the mounting plate 330 and the holding groove 331 having a shape corresponding to the shape of the rotation plate 320 may be formed in the rear surface of the mounting plate 330.

When the angle θ2 formed between the mounting plate 330 and the rotation plate 320 along the rotation of the mounting plate 330 with respect to the rotation plate 320 is zero, the rotation plate 320 may be inserted in the holding groove 331 formed in the rear surface of the mounting plate 330. Accordingly, the mounting plate 330 may be disposed parallel to the case 110.

As mentioned above, the present disclosure may mount the user terminal 2 thereon not only inclinedly but also flatly like the conventional wireless charging device.

Referring to one embodiment shown in FIG. 13, the terminal holder 300 may have an inclination in a height direction (z-axis direction) with respect to the arrangement direction (x-axis direction) of the transmitting coil 140. In this state, the terminal holder 300 may be movable forward and backward along the arrangement direction (x-axis direction) of the transmitting coil 140 by the moving member 200.

Accordingly, the user positioned in front of the terminal holder (+x-axis direction) can secure a view of the screen output from the user terminal 2. At this time, the user terminal 2 may be provided with power from one of the plural transmitting coils 140 based on the position (the position on the x-axis) of the terminal holder 300 to be charged.

Referring to another embodiment shown in FIG. 14, the terminal holder 300 may have an inclination in a height direction (z-axis direction) with respect to a direction (y-axis direction) that is horizontally perpendicular to the arrangement direction of the transmitting coil 140. In this state, the terminal holder 300 may be movable forward and backward along the arrangement direction (x-axis direction) of the transmitting coil 140 by the moving member 200.

Accordingly, the user positioned in front of the side (+y-axis direction) of the terminal holder 300 can secure a view of the screen output from the user terminal 2. At this time, the user terminal 2 may be provided with power from one of the plural transmitting coils 140 based on the position (x-axis position) of the terminal holder 300.

As described above, the present disclosure may allow the user positioned in various positions to check the screen output from the user terminal 2, while the user terminal 2 is being wirelessly charged, by rotating and moving the mounted user terminal 2 in the vertical direction or the horizontal direction.

The repeater 310 described above may transmit the magnetic field generated in the transmitting coil 140 to the receiving coil. To increase the strength of the magnetic field provided to the receiving coil, the strength of the magnetic field generated in the transmitting coil 140 and the linking to the repeater 310 should be large.

When the repeater 310 is projected on the upper surface of the case 110 in a vertical direction, a projection area R1 formed on the upper surface of the case 110 may be wider than an area R2 formed by each transmitting coil 140, in order to increase the strength of the magnetic field linking to the repeater 310.

Referring to FIG. 15, when the angle formed by the mounting plate 330 and the rotation plate 320 is zero, that is, when the terminal holder 300 is disposed parallel to the power transmission module 100, the repeater projection area R1 may have an area equal to the area substantially formed by the repeater 310 or it may be the maximum area. The repeater projection area R1 may be wider than the area R2 formed any of the plural transmitting coils 140.

Referring to FIG. 16, when the angle formed by the mounting plate 330 and the rotation plate 320 is the maximum, that is, when the terminal holder 300 forms a maximum inclination with respect to the upper surface of the case 110 provided in the power transmitting module 100, the repeater projection area R1 may have a minimum width. At this time, the repeater projection area R1 may be wider than the area R2 formed by any of the plural transmitting coils 140.

Specifically, the repeater projection area R1 may always be wider than the area formed by the transmitting coil 140, regardless of how much angle the terminal holder 300 forms with respect to the upper surface of the case 110. Accordingly, most of the magnetic field generated in the transmitting coil 140 may link to the repeater 310 and the repeater 310 may transmit power to the receiving coil with high efficiency.

As described above, the shape and arrangement of the repeater 310 according to the present disclosure may prevent the decrease in the strength of the magnetic field provided to the receiving coil inside the user terminal 2 which is caused by the inclinedly mounted user terminal 2, thereby always transmitting power with maximum efficiency to the user terminal 2 regardless of the mounting type of the user terminal 2.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

What is claimed is:

1. A wireless charging device comprising:
   a case;
   a flat plate core disposed in the case;
   a plurality of transmitting coils arranged side by side on the flat plate core;
   a terminal holder inclined with respect to an upper surface of the case, and comprising a repeater provided therein; and
   a moving member configured to move the terminal holder along an arrangement direction of the plurality of transmitting coils.

2. The wireless charging device of claim 1, wherein the plurality of transmitting coils comprise:
   a plurality of first coils spaced apart from each other on the flat plate core; and
   at least one second coil disposed on the plurality of first coils to be partially overlapped with the plurality of first coils.

3. The wireless charging device of claim 1, wherein the plurality of transmitting coils are arranged side by side at a same interval.

4. The wireless charging device of claim 1, wherein the moving member is provided on the upper surface of the case and is configured to be sliding-movable along the arrangement direction of the plurality of transmitting coils.

5. The wireless charging device of claim 1, wherein a sliding groove is provided on the upper surface of the case along the arrangement direction of the plurality of transmitting coils, and
   wherein the moving member is coupled to the sliding groove and sliding-moves along the arrangement direction of the plurality of transmitting coils.

6. The wireless charging device of claim 1, wherein the terminal holder is coupled to the moving member to be rotatable in a plane.

7. The wireless charging device of claim 1, wherein a circular recessed portion is formed in the moving member, and
   wherein the terminal holder is inserted in the recessed portion and rotatable in a plane.

8. The wireless charging device of claim 7, wherein a plurality of rotation grooves arranged side by side along a circumferential direction are provided in an inner circumferential surface of the recessed portion, and
   wherein the terminal holder is coupled to the plurality of rotation grooves to rotate in the plane by a unit angle.

9. The wireless charging device of claim 8, wherein the terminal holder includes:
   a rotation plate coupled to the moving member to be rotatable in a plane; and
   a mounting plate coupled to the rotation plate to be vertically rotatable with respect to the rotation plate.

10. The wireless charging device of claim 9, wherein the rotation plate comprises a plurality of rotation protrusions coupled to the plurality of rotation grooves, respectively.

11. The wireless charging device of claim 9, wherein the rotation plate is inserted in a holding groove formed in a rear surface of the mounting plate.

12. The wireless charging device of claim 1, wherein a repeater projection area formed in the upper surface of the case by projecting of the repeater on the upper surface of the case in a vertical direction is wider than an area formed by each transmitting coil.

13. The wireless charging device of claim 1, wherein when the terminal holder forms a maximum inclination with respect to the upper surface of the case, a repeater projection area formed on the upper surface of the case by projecting of the repeater on the upper surface in a vertical direction is wider than an area formed by each transmitting coil.

14. The wireless charging device of claim 9, wherein the rotation plate comprises a plurality of rotation protrusions coupled to the plurality of rotation grooves, respectively.

15. The wireless charging device of claim 1, wherein an inclination of the terminal holder with respect to the upper surface of the case is adjustable.

16. A wireless charging device comprising:
a power transmission module;
a moving member slidingly coupled to the power transmission module; and
a terminal holder rotatably coupled to the moving member,
wherein the power transmission module includes a plurality of transmitting coils sequentially arranged in an arrangement direction, and
wherein the moving member is configured to slide back and forth in the arrangement direction.

17. The wireless charging device of claim 16, wherein an inclination of the terminal holder with respect to an upper surface the power transmission module is adjustable from zero to a predetermined angle.

18. The wireless charging device of claim 16, wherein the moving member includes a circular recessed portion,
wherein the terminal holder includes a rotation plate with a circular portion, and
wherein the circular recessed portion of the moving member is coupled to the circular portion of the rotation plate with a coupling, and the coupling enables the terminal holder to rotate in a plane.

19. The wireless charging device of claim 18, wherein the circular recessed portion includes a plurality of rotation grooves, and
wherein the rotation plate comprises a plurality of rotation protrusions coupled to the plurality of rotation grooves to enable incremental rotation of the terminal holder in the plane.

20. The wireless charging device of claim 18, wherein the power transmission module incudes a sliding groove formed in the arrangement direction, and
wherein a width of the terminal holder is greater than a width of the sliding groove in a direction intersecting the arrangement direction.

* * * * *